(12) United States Patent
Singh et al.

(10) Patent No.: US 12,450,619 B2
(45) Date of Patent: Oct. 21, 2025

(54) EMBEDDED BUSINESS ANALYTICS BI-DIRECTIONAL FLOW

(71) Applicant: Honeywell International Inc., Charlotte, NC (US)

(72) Inventors: Ankit Singh, Apex, NC (US); Pinaki Ray, Fremont, CA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 213 days.

(21) Appl. No.: 18/166,313

(22) Filed: Feb. 8, 2023

(65) Prior Publication Data

US 2024/0265408 A1 Aug. 8, 2024

(51) Int. Cl.
*G06Q 30/0201* (2023.01)
*G06F 8/77* (2018.01)
*G06Q 10/0639* (2023.01)
*H04L 9/40* (2022.01)

(52) U.S. Cl.
CPC .......... *G06Q 30/0201* (2013.01); *G06F 8/77* (2013.01); *G06Q 10/0639* (2013.01); *H04L 63/102* (2013.01)

(58) Field of Classification Search
CPC ...... G06Q 30/0201; G06F 8/77; H04L 63/102
USPC ....................................................... 705/7.29
See application file for complete search history.

(56) References Cited

U.S. PATENT DOCUMENTS

| | | | |
|---|---|---|---|
| 7,899,837 B2* | 3/2011 | Polo-Malouvier | G06F 16/2428 707/769 |
| 10,671,628 B2* | 6/2020 | Sullivan | G06F 16/2455 |
| 2018/0121035 A1* | 5/2018 | Filippi | G06F 40/169 |
| 2020/0167154 A1* | 5/2020 | Nagar | G06F 8/36 |

FOREIGN PATENT DOCUMENTS

| | | | | |
|---|---|---|---|---|
| CN | 107943767 A | * | 4/2018 | G06F 40/18 |
| IN | 202041004329 A | * | 2/2020 | |

* cited by examiner

*Primary Examiner* — Abdallah A El-Hage Hassan
(74) *Attorney, Agent, or Firm* — ALSTON & BIRD LLP

(57) ABSTRACT

A method of bidirectional data flow includes: receiving analytics data at a repository of the business intelligence tool, wherein the analytics data is imported in a repository-compatible format; generating visualizations with the business intelligence tool using the analytics data; importing the generated visualizations from the business intelligence tool to a SaaS-hosted report generation tool; locating the imported visualizations within a report generated using the SaaS-hosted report generation tool, wherein the imported visualizations are located using one or more predefined templates; receiving approval for the located imported visualizations, wherein the received approval is based on one or more access permissions associated with a user based on access permissions stored in an identity and access module; and removing the analytics data from the repository of the business intelligence tool based on the received approval for the located imported visualizations, wherein the business intelligence tool is hosted in a containerized environment.

18 Claims, 6 Drawing Sheets

EMBEDDED BUSINESS ANALYTICS BI-DIRECTIONAL FLOW

TECHNICAL FIELD

The present disclosure relates to bidirectional data flow between an embedded tool and a parent application and, more particularly, to bidirectional data flow between a parent application and an embedded business intelligence tool.

BACKGROUND

Currently, there is no way to enable bidirectional data flow of content and/or commands from a parent app to an embedded business intelligence (BI) tool other than using manual steps. For instance, a user may need to screen capture or otherwise capture an image of a static object generated using a BI tool (e.g., a chart, graph, etc.) and manually import the image of the static object into a report. This type of manual data flow is painstaking and prone to the introduction of errors, leading to a greater possibility of errors in any given report. Accordingly, systems and methods for bidirectional data flow between a parent application and an embedded BI tool capable of generating dynamic objects may be required.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a method of bidirectional data flow between a business intelligence tool and a SaaS-hosted report generation tool includes: receiving analytics data at a repository of the business intelligence tool, wherein the analytics data is imported in a repository-compatible format; generating visualizations with the business intelligence tool using the analytics data; importing the generated visualizations from the business intelligence tool to a SaaS-hosted report generation tool; locating the imported visualizations within a report generated using the SaaS-hosted report generation tool, wherein the imported visualizations are located using one or more predefined templates; receiving approval for the located imported visualizations, wherein the received approval is based on one or more access permissions associated with a user based on access permissions stored in an identity and access module; and removing the analytics data from the repository of the business intelligence tool based on the received approval for the located imported visualizations, wherein the business intelligence tool is hosted in a containerized environment inside a virtual private cloud with the SaaS-hosted report generation tool.

In another embodiment, a system for bidirectional data flow between a business intelligence tool and a SaaS-hosted report generation tool includes a plurality of processing devices; and a memory, communicatively coupled with the plurality of processing devices and storing one or more processor-executable instructions that when executed by one or more of the plurality of processing devices cause the system to: receive, from a department owner, analytics data at a repository of a business intelligence tool, wherein the analytics data is imported in a repository-compatible format; generate visualizations with the business intelligence tool using the analytics data; import the generated visualizations from the business intelligence tool to a SaaS-hosted report generation tool; locate the imported visualizations within a report generated using the SaaS-hosted report generation tool, wherein the imported visualizations are located using one or more predefined templates; receive approval for the located imported visualizations, wherein the received approval is based on one or more access permissions associated with a user based on access permissions stored in an identity and access module; and remove the analytics data from the repository of the business intelligence tool based on the received approval for the located imported visualizations, wherein the business intelligence tool is hosted in a containerized environment inside a virtual private cloud with the SaaS-hosted report generation tool.

In yet another embodiment, a method of generating a report includes: providing a report generation URL to a plurality of department owners, wherein the report generation URL provides access to a relevant section of an unapproved report; receiving, from a department owner, analytics data at a repository of the business intelligence tool based on a selection of the report generation URL by the department owner, wherein the analytics data is imported in a repository-compatible format; generating visualizations with the business intelligence tool using the analytics data; importing the generated visualizations from the business intelligence tool to a SaaS-hosted report generation tool; locating the imported visualizations within a report generated using the SaaS-hosted report generation tool, wherein the imported visualizations are located using one or more predefined templates; receiving approval for the located imported visualizations, wherein the received approval is based on one or more access permissions associated with a user based on access permissions stored in an identity and access module; and removing the analytics data from the repository of the business intelligence tool based on the received approval for the located imported visualizations, wherein the business intelligence tool is hosted in a containerized environment inside a virtual private cloud with the SaaS-hosted report generation tool.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which.

DETAILED DESCRIPTION

Systems and methods described herein relate to bi-directional data flow between a parent application and a separate business intelligence (BI) tool embedded in the parent application. The parent application may be, as non-limiting examples, a quality management solution (QMS) app or an annual product quality reporting application. The parent application can be used, for example, to create forms and records in the quality processes for pharmaceutical companies. Examples of records and other data can include, as examples, complaints, risk assessments, document metadata, etc. In some embodiments, the parent app may be a multi-user online collaboration reporting app that collects data from various data sources and does analysis on that data to generate graphs and tables that go in the report.

Bidirectional data flow can include for example, flow of commands from the parent application and appropriate content from the BI tool to the parent application. The commands sent from the parent application may cause the BI tool to generate appropriate visualizations and dashboards dynamically. The content from the BI tool to the parent application can include, for example, details about medications, products, details about users, details about manufacturing and/or logistics processes, details about security, compliance, legal documents in the workflows, details about chemical compositions of drugs, the details about department roles and permissions etc. and in some embodiments, may be in the form of, for example, images or visualization files (e.g., charts, graphs, etc.). The images and/or visualizations may be located in an appropriate location such that when viewed in an HTML environment, the images and/or visualizations appear as intended to a view/user of a user interface displaying the images and/or visualizations.

In one exemplary embodiment, a visible dashboard may be displayed on a user interface (UI). Because the dashboard may include visible elements that are superfluous to a particular image or visualization that a user would like to have included in a report or other document (i.e., generated using the parent application), the user may have the necessary components imported automatically to the report using one or more of the systems and methods described herein.

Figure 1:
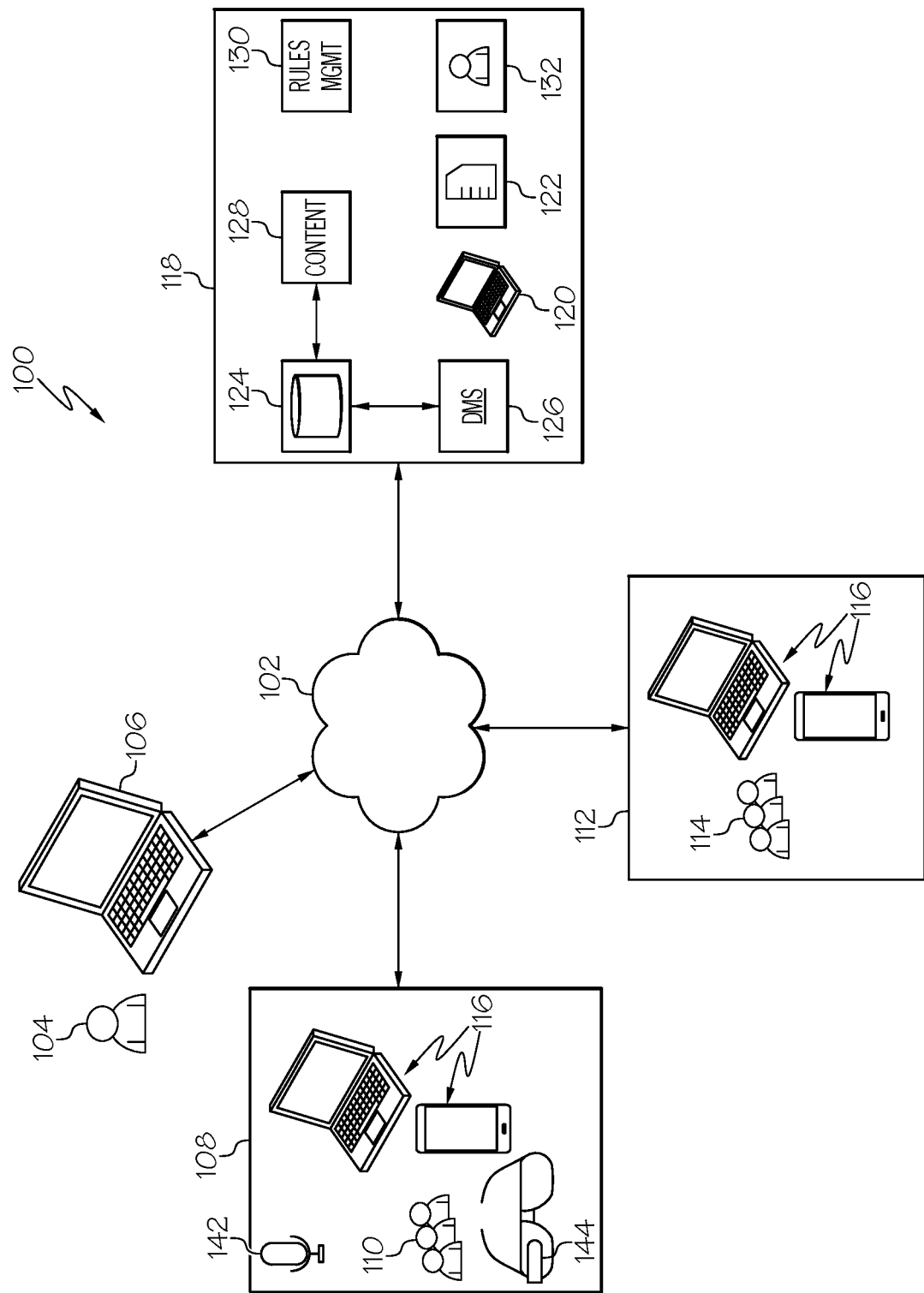
FIG. 1 illustrates an exemplary computing environment for implementing one or more of the systems and methods described herein.

Referring to FIG. 1, a system 100 for bidirectional data flow between a parent application and an embedded BI tool is shown. The system 100 may include a plurality of nodes comprising one or more processing devices (e.g., personal computers, computer networks, personal devices, device networks, etc.) communicatively coupled to a network 102. One or more users may be connected to the network 102. For example, an admin 104 may connect to the network through an admin device 106. In embodiments, users may be grouped via department. For example, a first department 108 may include one or more users 110 and a second department 112 may include one or more users 114. The users may connect to the network 102 via user devices 116. A document management server (DMS) 118 may be communicatively coupled to the network 102. The DMS 118 may comprise one or more processing devices 120, one or more memory devices 122, one or more databases 124 (or repositories, content repositories, etc.), a document management system (DMS) module 126, a content module 128, a rules management module 130, and a user profile module 132. In some embodiments, one or more of the users 110 may provide inputs to the system 100 via one or more input devices. For example, the users 110 may provide input to the system 100 via an audible input 142 and/or a hands-free input 144. The audible input 142 may be communicatively coupled to, for example, software for understanding one or more speech inputs and the hands-free input 144 may be capable of receiving and providing to the system 100 one or more inputs based on visual and/or audible data (e.g., by scanning a QR code, etc.)

The network 102 may be used to transmit data from the various data processing devices to the server (e.g., a computer of any appropriate configuration) in an appropriate manner. For instance, the data processing device(s) and the server may communicate over a local area computer network (LAN) or a public computer network (e.g., the Internet). In some embodiments, the network 102 may be a private LAN and may be separated from the public Internet by, for example, a firewall. The information associated with a context-based search may be transmitted from the server to one or more of the nodes in any appropriate manner. For instance, the server and a node (e.g., a personal computer; a desktop computer; a laptop computer; a "dumb" terminal) at any location connected to the network may communicate over a computer network, such as a public computer network (e.g., the Internet). A web application may be used to view search results as well.

The one or more processors 120 may communicatively couple with the one or more memory devices to perform one or more of the computer-based methods described herein. The DMS 118 may enable users to manage one or more types of files such as, for example, text-based files, image-based files, charts, presentations, images, videos, sounds, and other types of files. The DMS 118 may present one or more interfaces including a query function, allowing users to search a connected database and may provide search results using a search engine that can conduct a search of the relevant databases communicatively coupled to a device of the user. In some embodiments, the relevant databases may be automatically selected for a given search based on a profile of the user (as determined, for example, with the user profile module 132). The automatically selected databases may be a default setting based on, for example, a profile of the user (e.g., to which department a user identity is assigned) and the selected databases may be configurable such that a user can decide which databases the user's queries search.

The content module 128 may include one or more caches or containers for storing corporate documents and other content. For example, with brief reference to FIG. 2, the content module 128 may include a UI container 202 and/or a BI tool container 204. Referring again to FIG. 1, in embodiments, a content type may define how the content is stored in the content module 128. For example, business logic and methods, database structure, definitions (e.g., schema, field, table, etc.) and associated content of different content types may be stored in different manners, accordingly. Business logic and the methods of the module may be configured to act based on particular content items having been stored in the database (e.g., in the case of a particular visualizations or visualization data being stored in one or more aspects of the content module 128). For example, content with a characterization of "corporate" or characterized as belonging to a particular department (e.g., Quality Review, Testing, Sales, Corporate, etc.) may relate to visualizations from the respective department and may be configured to populate reports for users from those departments at a higher rate based on commands/searches/input from users in that respective department. The content type may include documents which are only visible to users of one or more particular department (e.g., only visible to members of the Sales department or only visible to members of the Corporate department, etc.) and such content may never be visible during report generation from members of departments which do not have access to such labeled, access-protected content. Content type may be based on a user's role within a department and content may be filtered and/or stored based on such role. For example, content generated (e.g., reports and/or visualizations generated) by a Researcher may be labeled as such and may be more likely to populate in searches by other Researchers even if the researcher is from a separate department. Similarly, content labeled as generated by a user with a Sales function may be more likely to populate for reports generated by other users with a Sales function.

The rules management module 130 may administrate one or more Business rules for dynamically presenting visual content in order to present the most relevant visual content to a user in a useful manner. In some embodiments, ranking rules may be used to promote or demote a particular visualization from amongst others, such that the promoted or demoted visualization may increase or decrease in ranking, respectively. Ranking may be based on, for example, the number of times a particular visualization or data used to generate a visualization is interacted with, a number of users who interact with such data, or other Business rules. These rules may reposition the particular item(s) or data in a results listing to make it more likely that a user is aware of the particular item(s) or data and/or such that the item(s) or data is more likely to be included in exported visualizations from the BI tool to the parent application.

The user profile module 132 may collect or receive user profile information from the various users of the systems. In some embodiments, the user profile information includes information about the user such as the user's department, the user's role within the department or larger organization as a whole, a current or typical location of the user, various certifications or accreditations of a user, or other information. User profile information may include information related to visualizations used, visualizations viewed (e.g., by determining a length that a particular visualization is open and active on a user's screen, etc.), visualizations interacted with (e.g., selected, edited, etc.), documents drafted and information about the documents drafted (e.g., length, word choice, etc.), recent searches by the user, and other information. In some embodiments, the user may update information associated with his or her profile individually. For example, a user may input his or her department when creating his or her own user profile (e.g., by selecting a department from amongst various departments in a drop down) or may assign one or more filters temporarily to his or her profile. For example, if a user knows that they do not wish to receive visualization data relating to documents (e.g., an Annual Product Quality Review ("APQR") from before a particular date (e.g., May 1, 2020), the user could add such restriction to their profile. User profile information may be collected and stored in a database, for example, the database(s) 124. Additionally, the user profile module 132 may assign a correlation between a particular search result in a set of search results as of particular interest to a given user profile with a correlation number, which correlation number may be used to update future visualization preferences.

The user profile module 132 may further include one or more aspects for managing user access permissions for example, the user profile module 132 may include one or more identity and access management (IAM) functions. The IAM functions could be enacted using, for example, a connection to one or more IAM databases (e.g., in the database(s) 124). The IAM function could be configured to communicate with other aspects of the system 100 using, for example, one or more connections via the network 102. The IAM function could use an IAM database to store, parse, categorize, or take other actions, for example, access rules, restriction requirements, management information, collected data, correlated data, predication data, behavioral information, and other suitable information, or any combination thereof. Further, the IAM function could dynamically restrict authorized users and access attempts if such users or access attempts occur when the IAM function may vulnerabilities or behaviors that are deemed hostile to the network 102. Accordingly, the IAM function and its use of tracking and monitoring behaviors over a long period of time could provide an added measure of security to any pre-defined policies followed by systems or subsystems communicatively coupled with the IAM function. In some embodiments, the IAM function may restrict access to particular data (e.g., business analytics data) or visualizations based on such data based on, for example, a department of a user or other aspect of a user's profile.

Figure 2:
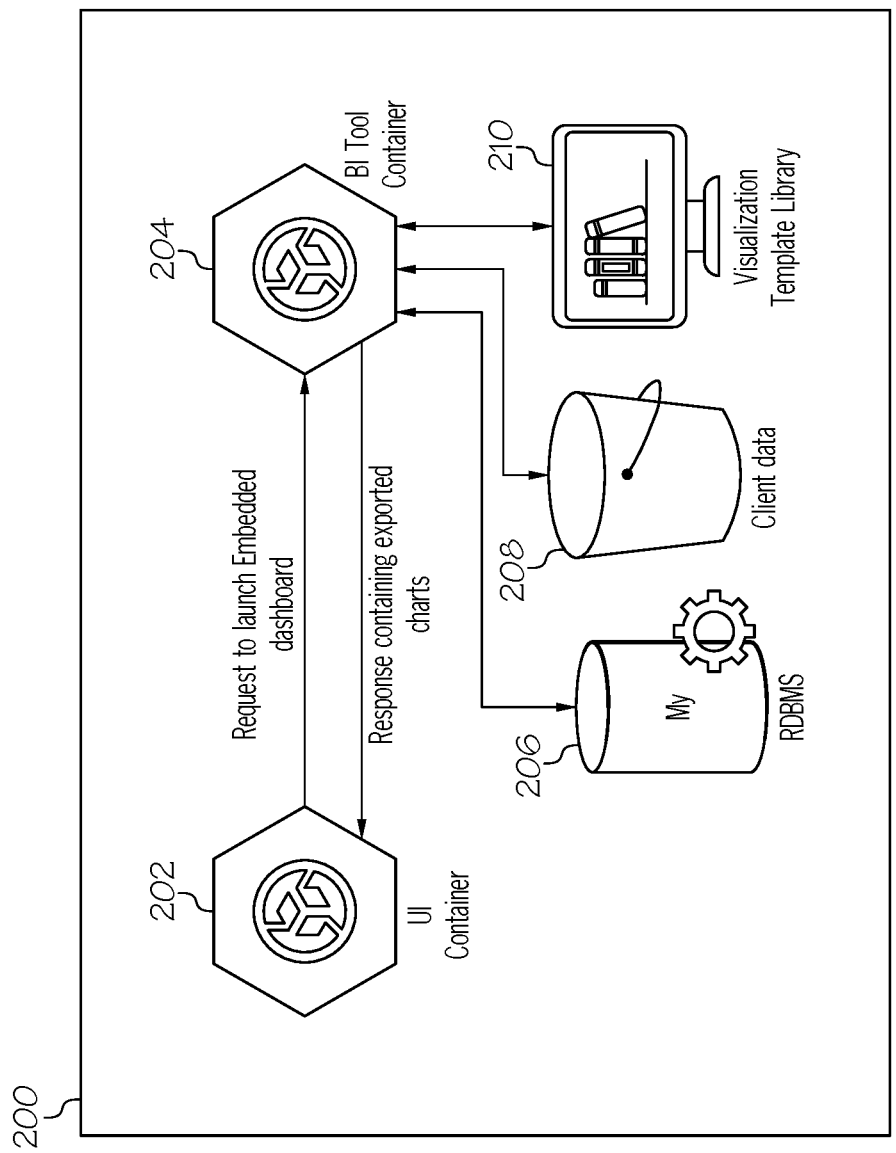
FIG. 2 further illustrates one or more aspects of the exemplary environment of FIG. 1.

Referring to FIG. 2, an exemplary environment 200 for bidirectional flow between a parent application (e.g., a SaaS-hosted report generation tool) and a BI tool is shown. In some embodiments, one or more aspects of the environment 200 may be hosted or actions may occur within a virtual private cloud. The environment 200 includes a UI container 202 and a BI tool container 204. The BI tool container 204 may further be communicatively coupled to a relational database management system (RDBMS) 206, a client data repository 208, and a visualization template library 210.

The UI container 202 may be hosted in a SaaS-hosted report generation tool that is communicatively coupled (e.g., via the network 102) to a business intelligence analytics tool that hosts the BI tool container 204. The UI container 202 is generally an element designed to contain various page elements (e.g., graphics, texts, etc.) that can hold any type of content and that can couple with other UI elements (e.g., grid, menu, etc.) to restrict a width of the elements to a reasonable size for a display of a user. Accordingly, the UI container may group content, components, and/or other containers into cohesive units on a page. The UI container may use, for example, one or more headers (i.e., hierarchical relationship indications) to represent nested and peer relationships between different content and/or content blocks. The various content within the UI container may include one or more callouts, which may be areas of a page that visually separate content from the rest of the page in order to highlight it. In some embodiments, the UI container 202 may use one or more disclosures to hide secondary content that may help simplify data presented to the user or otherwise presented using the UI. The disclosures may for example, default to loading in a closed state. In embodiments, the elements in the UI container 202 may appear at the same width for a given device (i.e., screen) size. This size may be calculated programmatically, for example, by determining the maximum device width available within a device breakpoint, given a desired minimum gutter size. Contents of the container may have any fluidity setting and/or alignment. In embodiments, the UI container 202 may generate a request to launch an embedded dashboard within the BI tool container 204 and may receive a response containing exported charts from the BI tool container 204.

In some embodiments, the SaaS-hosted report generation tool (i.e., parent application) including the UI container 202 may sent one or more commands to the BI analytics tool including the BI container 204 to generate the appropriate visualizations and dashboards dynamically. Subsequently, in some embodiments, the content could flow from the BI tool to parent app in forms of images (or visualizations) in the right location for an HTML page. This may for example, enable the BI tool to understand the metadata of the parent app (stored as one or more configurations in the BI tool). For example, a location of image templates for the parent app. Each visualization in the BI tool can be associated with a coordinate location in an HTML template (e.g., a static HTML template) along with attributes like size, color, filters, and other image attributes. This may enable the BI tool to render one or more visualizations such that they are ready to be displayed in a UI of the parent app and the UI of the parent app automatically knows which location of the HTML template to send it to and with what image attributes.

Similarly the parent app stores the metadata of the BI tool in a configuration store (i.e., the UI container 202) like the Project ID, Visualization ID, etc., so that if a user in the parent app clicks a button causing an importation of a visualization (e.g., an "Import to current Report" button), the parent app knows to where to import it. In some embodiments, it may be necessary to display a dashboard on the UI to manipulate analytics data but when a user tries to import just an image or other visualization from this dashboard on to the UI, the dashboard may be a superset of things that a user may want to show in the app, so the current configuration of features described herein may enable a user to remove certain elements of the dashboard in a final image that is rendered.

The BI tool container 204 may be hosted in a business analytics tool or business analytics module that is communicatively coupled (e.g., via the network 102) to the SaaS-hosted report generation tool that hosts the UI container 202. The BI tool container 204 may be an element designed to contain various page elements (e.g., graphics, texts, etc.) that can hold any type of content and that can couple with other UI elements (e.g., grid, menu, etc.) to restrict a width of the elements to a reasonable size for a display of a user. Accordingly, the BI tool container 204 may group content, components, and/or other containers into cohesive units on a page. The BI tool container 204 may use, for example, one or more headers (i.e., hierarchical relationship indications) to represent nested and peer relationships between different content and/or content blocks. The various content within the BI tool container 204 may include one or more callouts, which may be areas of a page that visually separate content from the rest of the page in order to highlight it. In some embodiments, the BI tool container 204 may use one or more disclosures to hide secondary content that may help simplify data presented to the user or otherwise presented using the BI tool. The disclosures may for example, default to loading in a closed state. In embodiments, the elements in the BI tool container 204 may appear at the same width for a given device (i.e., screen) size. This size may be calculated programmatically, for example, by determining the maximum device width available within a device breakpoint, given a desired minimum gutter size. Contents of the container may have any fluidity setting and/or alignment. In embodiments, the BI tool container 204 may receive a request to launch an embedded dashboard from the UI container 202 and may provide a response containing one or more charts and/or other BI elements. The charts and other BI elements may be generated based on and populated with client data from, for example, the client data repository 208.

The RDBMS 206 may be a collection of programs and capabilities that enable users to create, update, administer, and otherwise interact with a relational database. The RDBMS 206 may provide user's the capability to create, read, update, and delete data and may store data in the form of tables and users may use Structured Query Language (SQL) or another query language to access the database and may include one or more extensions that pair SQL use with common programming languages, such as the Common Business-Oriented Language (COBOL), Java and .NET. The RDBMS 206 may accept access from multiple users simultaneously. The RDBMS 206 may include one or more data dictionaries and metadata collections. One or more utilities of the RDBMS 206 may automate data loading and database backup and may store one or more log files that may track system performance based on, for example, selected operational parameters.

The client data repository 208 (data archive, library, etc.) may be a segmented data set used for reporting or analysis. The client data repository 208 may store data from a client related to operations and management of the client's systems, products, services, or other operations. The client data may be and/or relate to, for example, data needed for an APQR report (e.g., for the generation of visualizations or other elements of the report). A client may login and upload their data to the client data repository and such data may be used by the BI tool container 204 to generate visualizations in association with the SaaS-hosted report generation tool via the UI container 202 as described in greater detail herein. The client data may be stored in one or more of a data warehouse, a data lake, a data mart, one or more metadata repositories, one or more data cubes, or other data storage.

The visualization template library 210 may contain a store of various templates for charts, graphs, and other visualizations from which a user may select a template for quick customization. In some embodiments, the visualization template library 210 may include one or more visualization templates and/or dashboard templates. The users may be capable of adding new visualization templates to the visualization template library 210 based on their user permissions. The visualization templates may include metadata definitions such as, for example, a creator, editor, time of last edit, and other metadata.

In some embodiments, one or more aspects of the environment 200 or the environment itself include one or more software development kits (SDK). The one or more SDKs can take the form of one or more application programming interfaces (APIs), and may include, for example, one or more on-device libraries of reusable functions used to interface to various programming languages. In some embodiments, the one or more SDKs may be or include hardware-specific tools that can communicate with one or more embedded systems. Common tools may include, for example, debugging facilities and other utilities, which facilities and utilities may be presented in an integrated development environment (IDE). The one or more SDKs may include, for example, sample software and/or technical notes along with documentation, and tutorials for the one or more users of the system.

Figure 3:
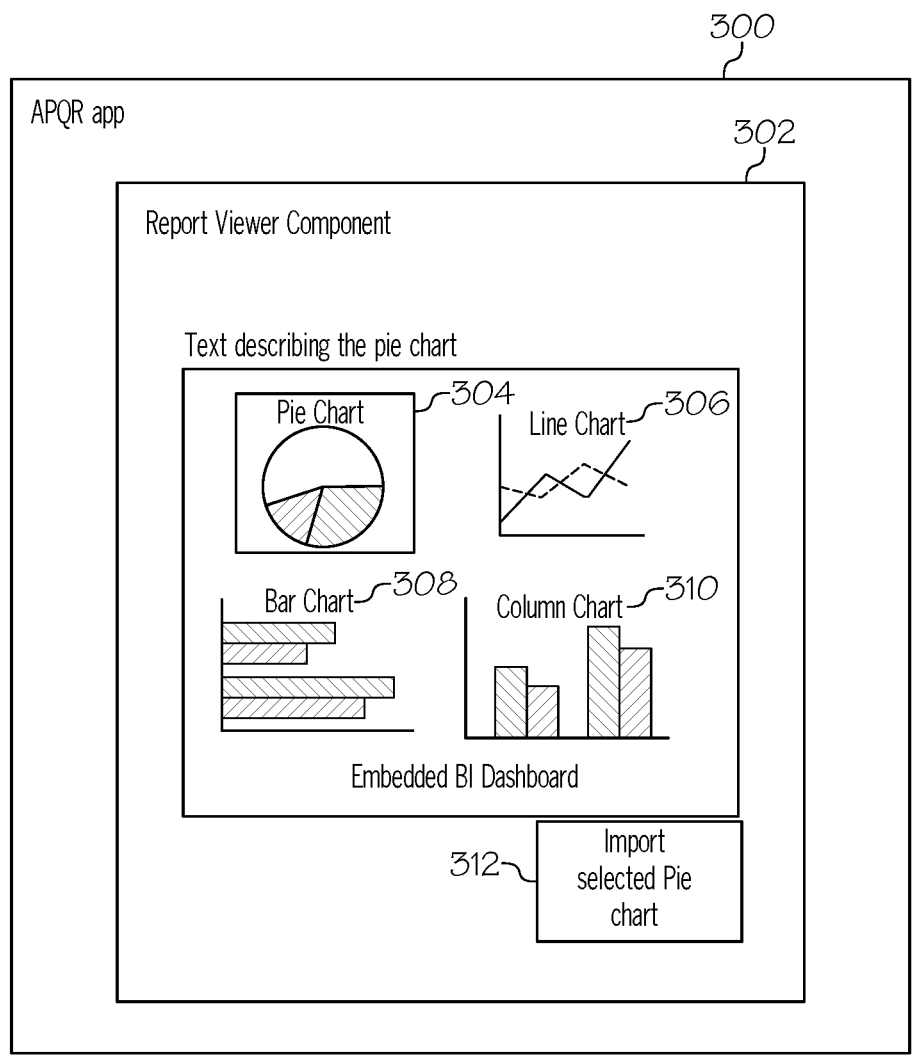
FIG. 3 illustrates an application programming interface including a dashboard for implementing one or more of the systems and methods described herein.

FIG. 3 shows a UI 302 in an APQR generation tool 300. The APQR may be displayed on a display, which display may be communicatively coupled to a computing device. The UI 302 may include various charts such as, for example, a pie chart 304, a line chart 306, a bar chart 308, a column chart 310, and other various charts and visualizations. In some embodiments, the UI includes an import visualization selector 312.

With respect to FIG. 3, in some embodiments, a user may log into a parent application (e.g., the SaaS application) and launch the BI tool to create visualizations. The user may launch a BI tool dashboard (e.g., the dashboard shown in FIG. 3), which may be embedded in the SaaS app or in an external window. The user may select a correct amount of data for visualizations and may manipulate a type of chart as well as various details about the chart (e.g., a type of x and y axis, labels, etc.) The user may then import all visualizations which may start a second direction of data flow. That is, from the BI tool to the parent SaaS app. In embodiments, there is intelligence built into the BI tool (e.g., via metadata exchange or software processes, the system may generate images (e.g., screengrabs) of the various visualizations and may store them in an object storage (e.g., via a web service interface) under a correct folder structure (for example companyId>/<departmentId>/<productid>/<userId>/<ReportId>/). Once the visualizations are stored in the object storage, another process may pull the images from this location and place them in a report.

Figure 4:
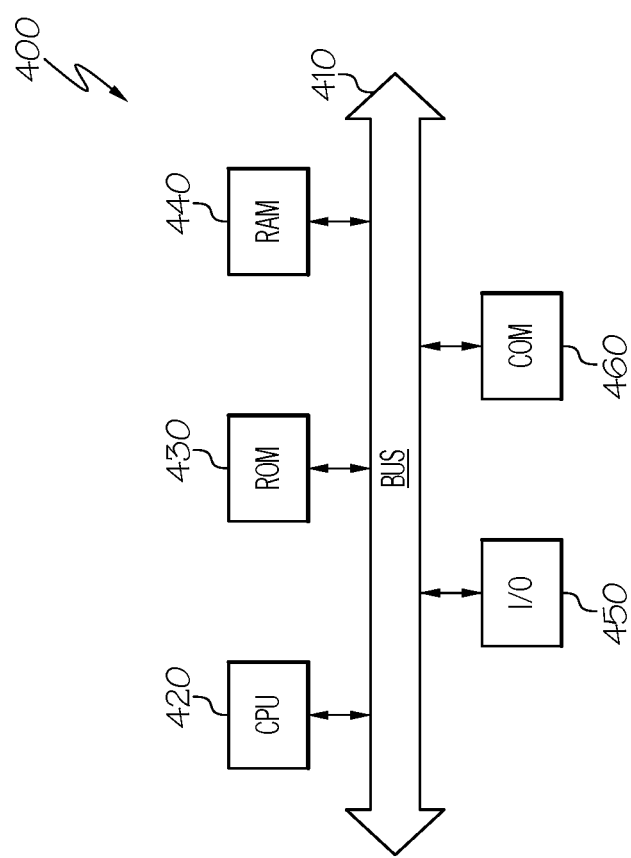
FIG. 4 illustrates an exemplary computing structure for implementing one or more of the systems and methods described herein.

FIG. 4 is a simplified functional block diagram of a computing system 400 that may be configured for carrying out one or more of the steps, programs, and/or executing techniques described herein, according to exemplary embodiments of the present disclosure. Specifically, in one embodiment, any of the modules of the system 100 may be an assembly of software and/or hardware including, for example, a data communication interface 460 for packet data communication. The platform may also include a central processing unit ("CPU") 420, in the form of one or more processors, for executing program instructions. The platform may include an internal communication bus 410, program storage, and data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 4 and the following discussion provide a brief, general description of one example of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 4. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 5:
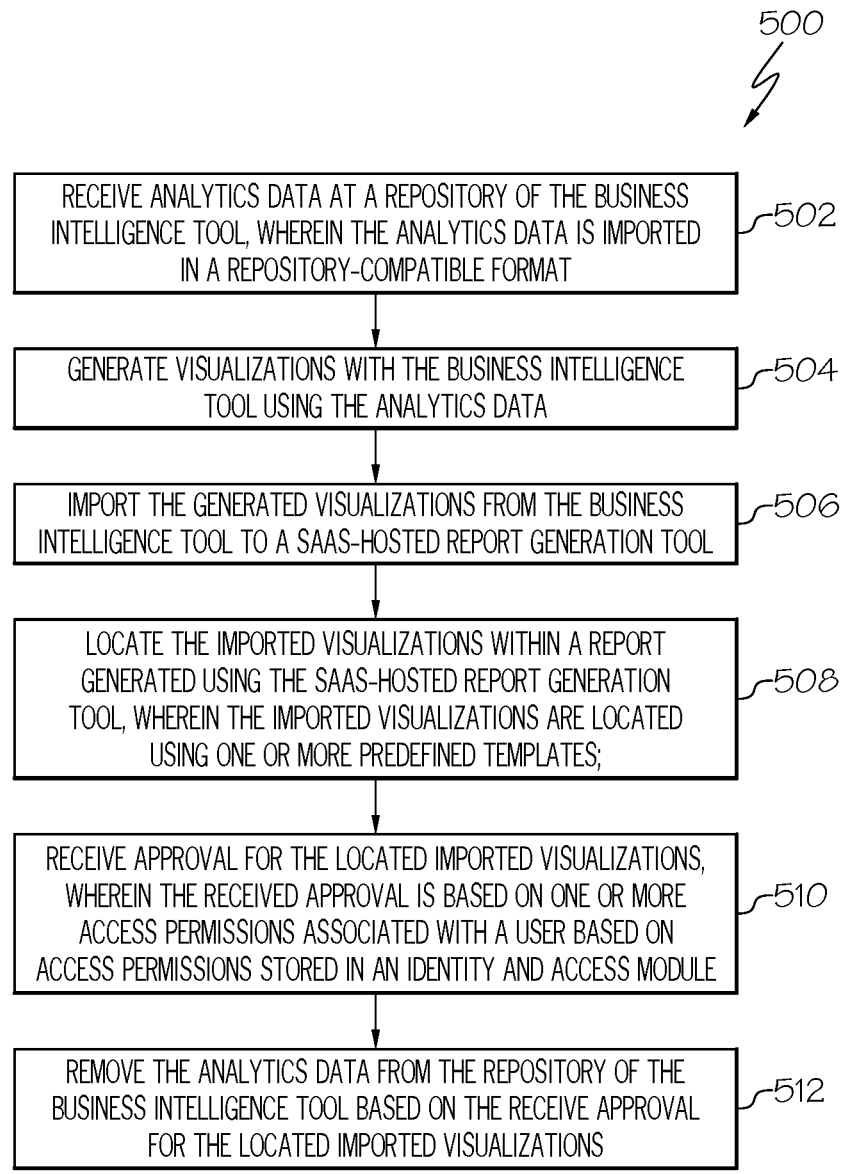
FIG. 5 illustrates a method for contextually comparing documents.

Referring to FIG. 5, a method 500 for bidirectional data flow between a business intelligence tool and a SaaS-hosted report generation tool is shown. The method 500 includes the various steps listed therein but it is to be understood that methods having fewer or more steps that that shown in FIG. 5 are contemplated herein.

At step 502, the system may receive analytics data at a repository (or library, archive, etc.) of the business intelligence tool, such as, for example, the client data repository 208 of FIG. 2. In some embodiments, the data repository may include one or more data warehouses, data lakes, data marts, and/or one or more data cubes. The client data may be received from any number of clients in any format and may be received for the purpose of mining and reporting on the data as described herein. In some embodiments, the data is formatted before it is sent to the client data repository 208. The data may be structured or unstructured and may be tagged, for example, with metadata. In some embodiments, the data is raw data which will be used in the generation of an Annual Product Quality Review (APQR) report. The analytics data may be imported in a format that is repository-compatible and one or more transformations may be performed on the data in order to format into a repository-compatible format. In some embodiments, these transformations may be performed by the clients themselves and/or by other users. The client data repositories may be individual to a particular client or they may be common to one or more clients and in some embodiments, the clients or other users may use one or more extract-transformation-load (ETL) tools to migrate data to the data repository.

At step 504, the system may generate one or more visualizations or process one or more business intelligence analyses with the business intelligence tool using the analytics data. The business intelligence tool may receive the data for analysis from, for example, the client data repository 208. The business intelligence tool may be containerized. Business intelligence analyses may include, for example, data mining, reporting, performance metric tracking, benchmarking, descriptive analytics, querying, statistical analysis, data visualization, visual analysis, data preparation, and other data analysis. Visualizations can be, for example, charts, graphs, and other visual data designed to ease the processing and understanding of data. In embodiments, the business intelligence tool may be hosted in a containerized environment inside a virtual private cloud with a SaaS-hosted report generation tool. The containerized environment may be used to abstract applications from the physical environment in which they are running and the various containers may package all dependencies related to a software component, and may run them in an isolated environment. The containerized environment may be run by a container engine and may have, for example, application containerization or system containerization. The containerized environment may utilize isolation, controlled at the operating system kernel level, to deploy and run applications, for example, containers may run an application instance of the business intelligence tool.

At step 506, the system may import the generated visualizations from the business intelligence tool to the SaaS-hosted report generation tool. The SaaS-hosted report generation tool may comprise a containerized UI, for example. The containerized UI may be communicatively coupled with the BI tool container such that the generated visualizations, based on client BI data from the client data repository, can be imported to the containerized UI upon a request from the containerized UI to launch an embedded dashboard. The embedded dashboard may show, for example, visualizations generated using the BI tool container.

At step 508, based on the importation of the generated visualizations, the system may locate the imported visualizations within a report generated using the SaaS-hosted report generation tool (e.g., in the UI container). In some embodiments, the imported visualizations are located using one or more predefined templates. In some embodiments, the one or more predefined templates may be predefined static HTML templates. In some embodiments, the templates may be pre-built visualizations that define a set area that may form a canvas with a predefined layout for an expected set of data. The visualization template may be used to generate visualizations in one or more areas, which areas may be, for example placeholders for certain types of data, shapes, and/or icons. These areas may be populated with shapes and icons based on available data and view rules. In some embodiments, the system may include a visualization template library or repository which may include all of the various visualization templates accessible by a user such that a user can select and include a pre-built template from the repository. In some embodiments, the imported visualizations may be imported in a vector file format or other suitable file format. In some embodiments, imported visualizations generated with the business intelligence tool may be imported from the business intelligence tool to the SaaS-hosted report generation tool statically.

At step 510, the system may receive approval for the located imported visualizations. The approval may come from, for example, one or more users of the system with appropriate access permissions to approve the imported visualization. That is, the received approval may be based on one or more access permissions associated with a user based on access permissions stored in, for example, an identity and access module. The identity and access module may store the user permissions along with information about the user, such as, for example, the user's department and/or the user's access permissions. In some embodiments, users may not be able to access visualizations for which their access permissions are not aligned. In some embodiments, users may be able to access but not approve visualizations for which their permissions are not aligned. Access permissions may be configured and/or reconfigured by, for example, a system admin.

At step 512, the system may remove the analytics data from the repository of the business intelligence tool based on the received approval for the located imported visualizations. For example, once the visualizations are approve and incorporated in a report (e.g., an APQR report). It may no longer be necessary for the data to remain in the repository, where it may be potentially vulnerable to unauthorized access and/or manipulation. Hence, upon approval of a visualization that is based on the data, the data may be deleted from the client data repository 208. In some embodiments, the command to delete the data may be generated in the UI container 202, in the BI tool container 204, and/or in another aspect of the system (e.g., the RDBMS 206). In some embodiments, deletion of the client data may be manually conducted or the data may be deleted based on some other automated process.

Figure 6:
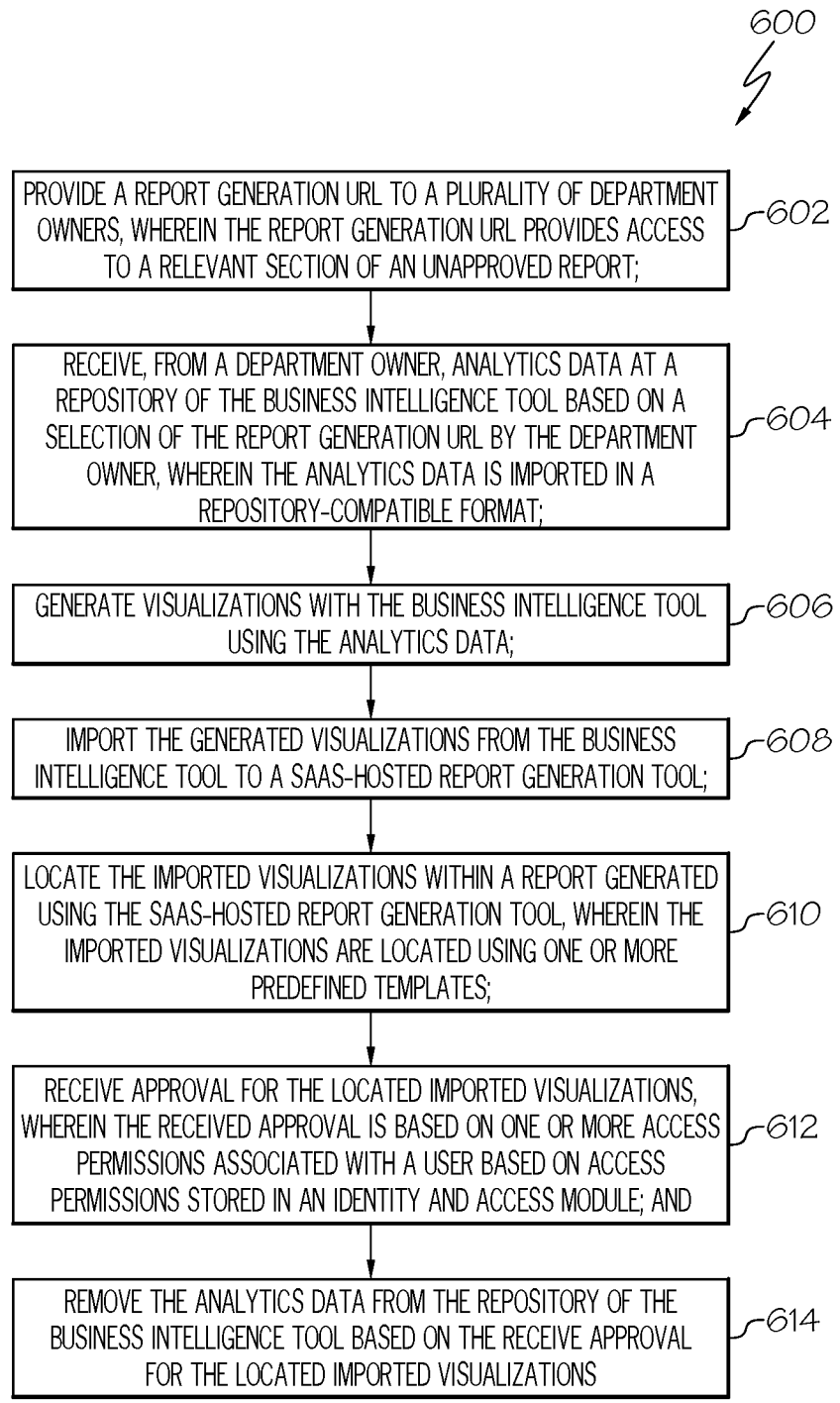
FIG. 6 illustrates a second method for contextually comparing documents.

Referring to FIG. 6, a method 600 for bidirectional data flow between a business intelligence tool and a SaaS-hosted report generation tool is shown. The method 600 includes the various steps listed therein but it is to be understood that methods having fewer or more steps that that shown in FIG. 6 are contemplated herein.

At step 602, a report generation URL may be provided to a plurality of department owners. The report generation URL may provide access to a relevant section, relevant multiple sections, or other relevant portions of an unapproved report (e.g., an APQR report). The report generation URL may be provided, for example, in an email, a text message, via a webpage, or using some other electronic means. The portions of the report may be determined relevant based on, for example, the recipients access and identity (e.g., via an identity and access module). In some embodiments, the system may require a password or other authentication before allowing the user to access the relevant portion or other portions of the report such that portions that are irrelevant or to which the user should not otherwise have access are inaccessible to the user. The user may request access (e.g., from a system admin) to the various relevant portions in some embodiments such that he or she requires access to in some embodiments and the access permissions may be granted based on the request and the URL with relevant portions may be provided upon such request.

At step 604, the system may receive analytics data at a repository of the business intelligence tool from a department owner based on a selection of the report generation URL by the department owner. In embodiments, the analytics data may be imported in a repository-compatible format such that it can be retained in the repository. The particular repository-compatible format may define features and capabilities of the particular repository. In some embodiments, the analytics data may be stored in a compressed format and the repository may be capable of sharding and/or repository packing. The analytics data can come from one or more external organizations, such as, for example, a customer or client. For example, a client may upload its analytics data to the repository of the business intelligence tool based on a selection of the URL. In some instances, the department owner may upload client data to the business intelligence tool repository. Analytics data can be related to, for example, analyses of various production processes, reviews and investigations of all deviations and non-conformances, reviews of approved change controls that could impact product quality, validation status, or regulatory filings, analyses of microbiological and chemical test results and conformance, analyses of stability studies and test results, assessments of quality of components (e.g., based on review of materials, packaging, etc.), reviews of market activity, reviews of quality events including product complaints, recalls, returns, etc., regulatory assessments, analyses of processes and methods including, for example, processing, cleaning, packaging, etc., assessments of suppliers, and other data.

At step 606, the system may generate visualizations with the business intelligence tool using the analytics data. The visualizations may include charts, graphs, images, and other visualizations. The visualizations can be generated from any data stored in the business intelligence tool repository that is fit for visualization and can be cross referenced with other data. The visualizations may be viewable on one or more displays. In some embodiments, the visualizations may be generated, for example, in an embedded dashboard, which embedded dashboard may be launched, for example, upon a request from the SaaS-hosted report generation tool.

At step 608, the system may import the generated visualizations from the business intelligence tool to a SaaS-hosted report generation tool. The generated visualizations may be stored in, for example, a container of the SaaS-hosted report generation tool. The SaaS-hosted report generation tool may incorporate the visualizations generated using the data provided by the client to the business intelligence tool repository. In some embodiments, the generated visualizations generated with the business intelligence tool are provided to the SaaS-hosted report generation tool based on a request from the SaaS-hosted report generation tool to the business intelligence tool and may include one or more exported charts, graphs, and other visual depictions of data (e.g., tables, etc.)

At step 610, the SaaS-hosted report generation tool may locate the imported visualizations within a report generated using the SaaS-hosted report generation tool. In embodiments, the imported visualizations may be located using one or more predefined templates. For example, the system users may generate one or more templates for incorporating the imported visualizations and the imported visualizations may be located based on the template(s) created by the users. The results may appear on a screen, for example, as they would appear on a sheet of paper or other physical medium for display.

At step 612, the system may receive approval for the located imported visualizations. In embodiments, the received approval may be based on one or more access permissions associated with a user based on access permissions stored in an identity and access module. The identity and access module may be in communication with the SaaS-hosted report generation tool and/or the business intelligence analytics tool via a network and may include data for verifying a user's identity using methods such as, for example, two-factor authentication, RSA encryption, SSK encryption, etc.

At step 614, the system may remove the analytics data from the repository of the business intelligence tool based on the received approval for the located imported visualizations. The analytics data may be removed such that it is inaccessible by other users once it has been approved for a given report. In some embodiments, data that is not used in the visualizations and/or otherwise in the report may also be deleted to free space and such that potentially sensitive data is not unnecessarily resting on the repository, where it is potentially accessible. In some embodiments, one or more users or user profiles may have access to delete data, unused or otherwise, and such users may schedule data for automatic deletion and/or may flag particular data for deletion by one or more other users (e.g., a system admin). Once the data is deleted from the business intelligence tool repository, it may be inaccessible from the SaaS-hosted report generation tool or otherwise.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method of bidirectional data flow between a business intelligence tool and a SaaS-hosted report generation tool comprising:
    receiving analytics data at a repository of the business intelligence tool, wherein the analytics data is imported in a repository-compatible format;
    generating visualizations with the business intelligence tool using the analytics data, wherein the generated visualizations comprise at least one of: charts, graphs, and images;
    extracting, by the business intelligence tool, metadata associated with layout attributes of the SaaS-hosted report generation tool from one or more stored configurations;
    parsing, by the business intelligence tool, the extracted metadata to determine coordinate locations in the predefined template of the SaaS-hosted report generation tool;
    dynamically generating, by the business intelligence tool, a rendered version of the visualizations in a vector image format based on the parsed metadata, the layout attributes, and the template identifiers;
    importing the generated visualizations from the business intelligence tool to a SaaS-hosted report generation tool dynamically based on the extracted metadata, determined coordinate locations in the predefined template, and rendered version of the visualizations, thereby enabling the business intelligence tool to interpret metadata of the SaaS-hosted report generation tool using one or more configurations, wherein the metadata of the SaaS-hosted report generation tool is stored as the one or more configurations in the business intelligence tool;
    locating the imported visualizations within a report generated using the SaaS-hosted report generation tool, wherein the imported visualizations are located using one or more predefined templates;
    receiving approval for the located imported visualizations, wherein the received approval is based on one or more access permissions associated with a user based on access permissions and information about user stored in an identity and access module; and
    removing the analytics data from the repository of the business intelligence tool based on the received approval for the located imported visualizations automatically,
    wherein the business intelligence tool is hosted in a containerized environment inside a virtual private cloud with the SaaS-hosted report generation tool.

2. The method of claim 1, wherein the SaaS-hosted report generation tool is an Annual Product Quality Review report generation tool.

3. The method of claim 1, wherein the virtual private cloud that hosts the SaaS-hosted report generation tool comprises a software development kit and the software development kit is in communication with the SaaS-hosted report generation tool.

4. The method of claim 3, wherein the business intelligence tool is hosted in a containerized environment inside a virtual private cloud with the SaaS-hosted report generation tool.

5. The method of claim 4, wherein the SaaS-hosted report generation tool software development kit hosts a plurality of embedded dashboards that are embedded in the business intelligence tool.

6. The method of claim 5, wherein the embedded dashboards are visible to a user.

7. The method of claim 1, wherein the imported visualizations generated with the business intelligence tool are imported from the business intelligence tool to the SaaS-hosted report generation tool statically.

8. The method of claim 7, wherein the imported visualizations are imported in a vector file format.

9. The method of claim 1, wherein the one or more predefined templates are predefined static HTML templates.

10. A system for bidirectional data flow between a business intelligence tool and a SaaS-hosted report generation tool comprising:
    a plurality of processing devices; and
    a memory, communicatively coupled with the plurality of processing devices and storing one or more processor-executable instructions that when executed by one or more of the plurality of processing devices cause the system to:
    receive, from a department owner, analytics data at a repository of a business intelligence tool, wherein the analytics data is imported in a repository-compatible format;
    generate visualizations with the business intelligence tool using the analytics data, wherein the generated visualizations comprise at least one of: charts, graphs, and images;
    extract, by the business intelligence tool, metadata associated with layout attributes of the SaaS-hosted report generation tool from one or more stored configurations;
    parse, by the business intelligence tool, the extracted metadata to determine coordinate locations in the predefined template of the SaaS-hosted report generation tool;

dynamically generate, by the business intelligence tool, a rendered version of the visualizations in a vector image format based on the parsed metadata, the layout attributes, and the template identifiers;

import the generated visualizations from the business intelligence tool to a SaaS-hosted report generation tool dynamically based on the extracted metadata, determined coordinate locations in the predefined template, and rendered version of the visualizations, thereby enabling the business intelligence tool to interpret metadata of the SaaS-hosted report generation tool using one or more configurations, wherein the metadata of the SaaS-hosted report generation tool is stored as the one or more configurations in the business intelligence tool;

locate the imported visualizations within a report generated using the SaaS-hosted report generation tool, wherein the imported visualizations are located using one or more predefined templates;

receive approval for the located imported visualizations, wherein the received approval is based on one or more access permissions associated with a user based on access permissions and information about user stored in an identity and access module; and remove the analytics data from the repository of the business intelligence tool based on the received approval for the located imported visualizations automatically, wherein the business intelligence tool is hosted in a containerized environment inside a virtual private cloud with the SaaS-hosted report generation tool.

11. The system of claim 10, wherein the SaaS-hosted report generation tool is an Annual Product Quality Review report generation tool.

12. The system of claim 10, wherein the virtual private cloud that hosts the SaaS-hosted report generation tool comprises a software development kit and the software development kit is in communication with the SaaS-hosted report generation tool.

13. The system of claim 12, wherein the business intelligence tool is hosted in a containerized environment inside a virtual private cloud with the SaaS-hosted report generation tool.

14. The system of claim 13, wherein the SaaS-hosted report generation tool software development kit hosts a plurality of embedded dashboards that are embedded in the business intelligence tool.

15. The system of claim 14, wherein the embedded dashboards are visible to a user.

16. A method of generating a report comprising:

providing a report generation URL to a plurality of department owners, wherein the report generation URL provides access to a relevant section of an unapproved report;

receiving, from a department owner, analytics data at a repository of a business intelligence tool based on a selection of the report generation URL by the department owner, wherein the analytics data is imported in a repository-compatible format;

generating visualizations with the business intelligence tool using the analytics data, wherein the generated visualizations comprise at least one of: charts, graphs, and images;

extracting, by the business intelligence tool, metadata associated with layout attributes of the SaaS-hosted report generation tool from one or more stored configurations;

parsing, by the business intelligence tool, the extracted metadata to determine coordinate locations in the predefined template of the SaaS-hosted report generation tool;

dynamically generating, by the business intelligence tool, a rendered version of the visualizations in a vector image format based on the parsed metadata, the layout attributes, and the template identifiers;

importing the generated visualizations from the business intelligence tool to a SaaS-hosted report generation tool dynamically based on the extracted metadata, determined coordinate locations in the predefined template, and rendered version of the visualizations, thereby by enabling the business intelligence tool to interpret metadata of the SaaS-hosted report generation tool using one or more configurations, wherein the metadata of the SaaS-hosted report generation tool is stored as the one or more configurations in the business intelligence tool;

locating the imported visualizations within a report generated using the SaaS-hosted report generation tool, wherein the imported visualizations are located using one or more predefined templates;

receiving approval for the located imported visualizations, wherein the received approval is based on one or more access permissions associated with a user based on access permissions and information about user stored in an identity and access module; and removing the analytics data from the repository of the business intelligence tool based on the received approval for the located imported visualizations automatically, wherein the business intelligence tool is hosted in a containerized environment inside a virtual private cloud with the SaaS-hosted report generation tool.

17. The method of claim 16, wherein the SaaS-hosted report generation tool is an Annual Product Quality Review report generation tool.

18. The method of claim 17, wherein the one or more predefined templates are predefined static HTML templates.

* * * * *